(12) United States Patent
Hanna et al.

(10) Patent No.: US 9,353,812 B2
(45) Date of Patent: May 31, 2016

(54) MASS REDUCTION OF BRAKE ROTORS

(75) Inventors: Michael D. Hanna, West Bloomfield, MI (US); Mohan Sundar, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 18 days.

(21) Appl. No.: 13/220,198

(22) Filed: Aug. 29, 2011

(65) Prior Publication Data

US 2013/0048447 A1 Feb. 28, 2013

(51) Int. Cl.
*F16D 65/12* (2006.01)
*F16D 65/00* (2006.01)
*F16D 65/02* (2006.01)

(52) U.S. Cl.
CPC ............ *F16D 65/12* (2013.01); *F16D 65/0006* (2013.01); *F16D 2065/1316* (2013.01); *F16D 2065/1328* (2013.01); *F16D 2250/0053* (2013.01)

(58) Field of Classification Search
CPC ... F16D 65/0006; F16D 65/12; F16D 65/125; F16D 65/127
USPC .............................. 188/18 A, 218 XL, 251 M
See application file for complete search history.

(56) References Cited

U.S. PATENT DOCUMENTS

| 4,406,714 | A | | 9/1983 | Bowes et al. | |
|---|---|---|---|---|---|
| 5,417,313 | A | * | 5/1995 | Matsuzaki et al. | 188/218 XL |
| 5,753,052 | A | * | 5/1998 | Dajoux et al. | 148/217 |
| 5,954,165 | A | * | 9/1999 | Kito et al. | 188/218 XL |
| 6,139,659 | A | * | 10/2000 | Takahashi et al. | 148/671 |
| 6,161,661 | A | * | 12/2000 | Pahle et al. | 188/218 XL |
| 8,287,667 | B2 | * | 10/2012 | Holly et al. | 148/318 |
| 2004/0011608 | A1 | * | 1/2004 | Tironi et al. | 188/218 XL |
| 2005/0082123 | A1 | * | 4/2005 | Khambekar et al. | 188/71.1 |
| 2006/0076200 | A1 | * | 4/2006 | Dessouki et al. | 188/218 XL |
| 2008/0000550 | A1 | * | 1/2008 | Holly et al. | 148/217 |
| 2008/0000737 | A1 | * | 1/2008 | Hirasawa et al. | 188/218 XL |
| 2009/0026027 | A1 | * | 1/2009 | Martino | 188/218 XL |
| 2009/0032569 | A1 | * | 2/2009 | Sachdev et al. | 228/2.3 |
| 2009/0260931 | A1 | * | 10/2009 | Ulicny et al. | 188/218 XL |
| 2010/0044171 | A1 | * | 2/2010 | Hoshi et al. | 188/218 XL |
| 2010/0258394 | A1 | * | 10/2010 | Hanna et al. | 188/264 A |

FOREIGN PATENT DOCUMENTS

JP 2007247868 A * 9/2007

* cited by examiner

*Primary Examiner* — Thomas J Williams
(74) *Attorney, Agent, or Firm* — BrooksGroup

(57) ABSTRACT

One exemplary embodiment may include a product including a first brake rotor cheek having a first body and at least a first outer surface. A first hardened region may extend from the first outer surface towards the center of the body. In one embodiment, the first hardened region may include a nitrocarburized ferrous metal.

21 Claims, 2 Drawing Sheets

MASS REDUCTION OF BRAKE ROTORS

TECHNICAL FIELD

The field to which the disclosure generally relates includes brake rotors and methods of making and using the same.

BACKGROUND

Brake rotors typically include a hub and at least one rotor cheek (friction surface) attached to the hub. To stop a vehicle, brake pads are pressed against the outer surfaces of the brake rotor cheek. The outer surfaces of the brake rotor cheek are manufactured to be relatively flat. However, over time, the outer surfaces of the brake rotor cheek may become gouged, corroded, or uneven resulting in undesirable performance of the brake rotor cheek and braking operations. To address this situation, brake rotor cheeks are typically made sufficiently thick so that the outer surface of the brake rotor cheek may be resurfaced, removing metal and making the outer surfaces flat again.

Vented brake rotor cheeks typically include a hub and two parallel cheeks having a plurality of spaced apart vanes extending between inner faces of each of the brake rotor cheeks. The collective thickness of the two spaced apart rotor cheeks and vanes extending therebetween is typically greater than the thickness of a single brake rotor cheek, particularly when the vented brake rotor cheek is manufactured to allow for resurfacing of the outer face of each of the two parallel brake rotor cheeks.

Disc brake rotors, both single cheek and vented brake rotors, have been known to vibrate at undesirable frequencies, often producing undesirable squeal.

SUMMARY OF EXEMPLARY EMBODIMENTS OF THE INVENTION

One exemplary embodiment may include a product including a first brake rotor cheek having a first body and at least a first outer surface. A first hardened region extends from the first outer surface towards the center of the body. In one embodiment, the first hardened region includes a nitro-carburized ferrous metal.

In one exemplary embodiment, the product further includes a damping insert received in the first body and constructed and arranged to dampen vibration of the first brake rotor cheek during operation.

In another exemplary embodiment, the product further includes a second brake rotor cheek including a second body and at least a second outer surface. A second hardened region extends from the second outer surface toward the center of the body. A plurality of spaced apart vanes extend between a first inner surface of the first rotor cheek and a second inner surface of the second rotor cheek.

Another exemplary embodiment may include a method including forming a first hardened region extending from a first outer surface toward the center of a first body of a first rotor cheek, including heat treating the first rotor cheek in a furnace, and introducing liquid or gaseous materials including nitrogen and carbon into the furnace.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

One embodiment of the invention may include a product including a first brake rotor cheek comprising a first body and at least a first outer surface, a first hardened region extending from the first outer surface toward the center of the body. In one embodiment, the first hardened region comprises a nitro-carburized ferrous material.

Figure 1:
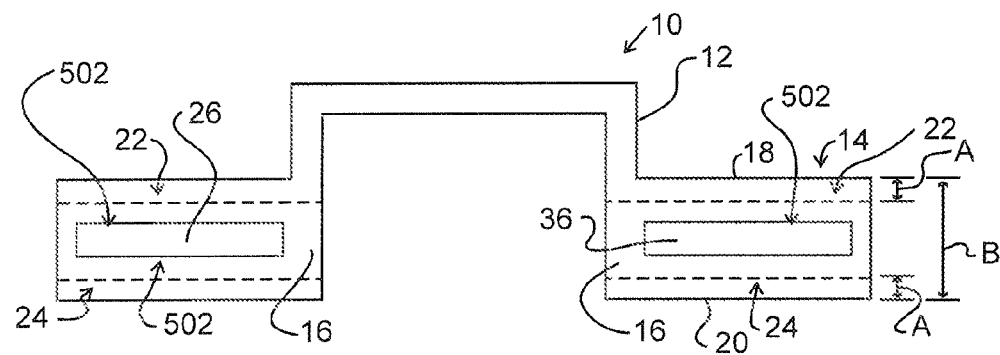
FIG. 1 is a sectional view of a brake rotor including a single brake rotor cheek having a first hardened region according to one embodiment of the invention.

Referring now to FIG. 1, one embodiment may include a product 10 such as a disc brake rotor including a hub portion 12 and at least a first rotor cheek 14. The first rotor cheek 14 may be attached to the hub portion 12 and could be of different material. In a preferred embodiment, the product 10 may include the hub portion 12 and the first rotor cheek 14 made from cast or machined metal. The first rotor cheek 14 may include a first body portion 16 having a first outer surface 18 and a second opposite outer surface 20. In one embodiment, a first hardened region or surface 22 may extend from the first outer surface 18 toward the center of the body 16. In another embodiment, a second hardened region or surface 24 may extend from the second outer surface 20 toward the center of the body 18.

One embodiment of the invention includes a product 10 and may have frictional damping means. The frictional damping means may be used in a variety of applications including, but not limited to, applications where it is desirable to reduce noise associated with a vibrating part or reduce the vibration amplitude and/or duration of a part that is struck, dynamically loaded, excited, or set in motion. In one embodiment the frictional damping means may include an interface boundary conducive to frictionally dampen a vibrating rotor. In one embodiment the damping means may include frictional surfaces 502 constructed and arranged to move relative to each other and in frictional contact, so that vibration of the part is dissipated by frictional damping due to the frictional movement of the surfaces 502 against each other.

According to various illustrative embodiments of the invention, frictional damping may be achieved by the movement of the frictional surfaces 502 against each other. The movement of frictional surfaces 502 against each other may include the movement of: surfaces of the body 16 of the part against each other; a surface of the body 16 of the part against a surface of the insert 26; a surface of the body 16 of the part against a coating layer 36; a surface of the insert 26 against the layer 36; a surface of the body 16 of the part against particles or fibers; a surface of the insert 26 against the particles or fibers; or by frictional movement of the particles or fibers against each other or against remaining coating material.

Optionally, an insert 26 may be received in the body 16 and may be constructed and arranged to damp vibration of the first rotor cheek 14. In one embodiment, the hardened regions 22, 24 may extend a distance ranging from 0.1 to 2 mm from the outer surfaces 18, 20 respectively toward the center of the body 16. The hardened regions 22, 24 eliminate the need to resurface the brake rotor cheek 14 due to gouges or unevenness produced during braking operations over a period of time or substantially the wear of surfaces 22, 24 compared to brake rotors that have not been hardened. In one embodiment, the hardened regions 22, 24 may each include a nitro-carburized ferrous metal. Brake rotor cheeks having a reduced thickness and mass compared to traditional brake rotor cheeks may be utilized wherein the brake rotor cheeks have been treated to provide a nitro-carburized surface. The nitro-carburized surface may have improved resistance to wear and need little to no resurfacing with use. In one embodiment a brake rotor cheek with a nitro-carburized surface may be combined with a light weight insert for further reduction in mass of the brake rotor compared to traditional designs. Preferably, the remainder of the body portion 16 may include a cast iron. In one embodiment, the hardened regions 22, 24 and body 16 may be a continuous metallurgical structure without any defining interfaces therebetween. In an alternative embodiment as will be described hereafter, the hardened regions 22, 24 may be provided by an inlay. In one embodiment the insert 26 may have a continuous annular body portion.

Figure 2:
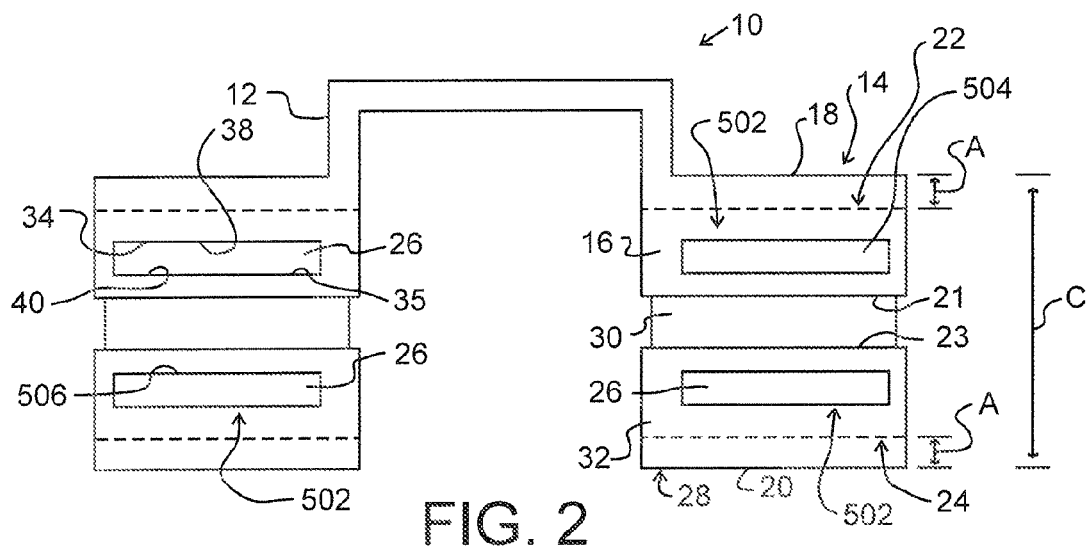
FIG. 2 is a sectional view of a vented brake rotor including first and second brake rotor cheeks having at least one hardened region according to one embodiment of the invention.

Referring now to FIG. 2, another embodiment may include a product 10 which may be a vented brake rotor including a hub portion 12 and at least a first brake rotor cheek 14 which in this embodiment includes a second outer surface 21 opposite the first outer surface 18. A second brake rotor cheek 28 is provided and includes a second outer surface 23 opposite a second outer surface 20. A plurality of spaced apart vanes 30 may extend from the second outer surface 21 of the first brake rotor cheek 14 to the second inner surface 23 of the second brake rotor cheek 28. A damping insert 26 may be provided in at least one of the first brake rotor cheek 14 or the second brake rotor cheek 28. In this embodiment, a first hardened region 22 may extend from the first outer surface 18 of the first brake rotor cheek 14 toward the center of the first body 16. A second hardened region 24 may extend from the second outer surface 21 of the second rotor cheek 28 toward the second body 32. Again, the thickness of the first and second regions 22, 24 may each range from about 0.1 to about 2 mm. The combined thickness of the first brake rotor cheek 14, vanes, and second brake rotor cheek 28 as shown by arrow C may be less than 500 mm.

Figure 3:
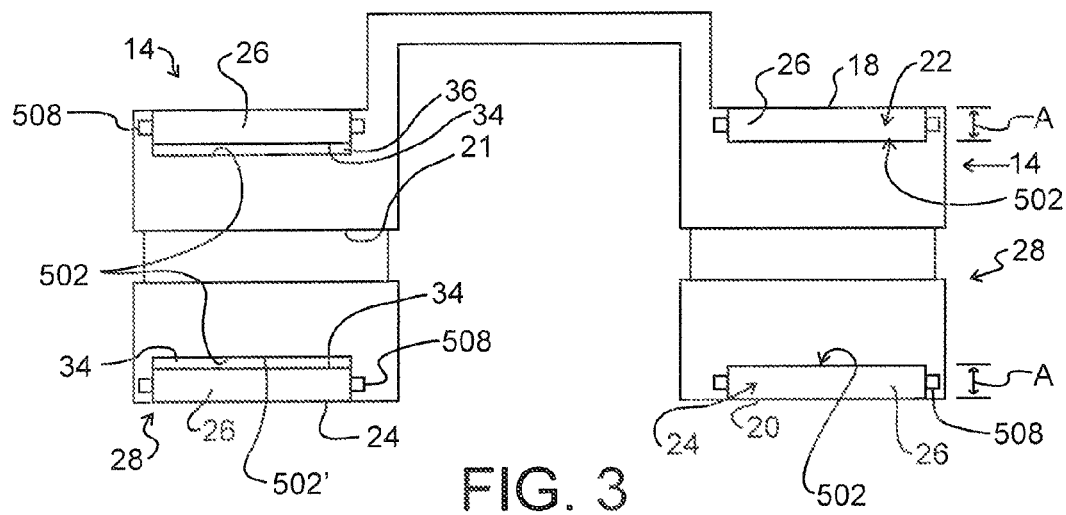
FIG. 3 is a sectional view of a brake rotor having an inlay according to one embodiment of the invention.

Referring now to FIG. 3, in another embodiment, the first and second hardened regions 22, 24 may be provided by inserts in the form of inlays 26 which are received in at least one of the first brake rotor cheek 14 or second brake rotor cheek 28. The inlays 26 may provide the first outer surface 18 or second outer surface 20. The inlays 26 may have a surface 34 or coating 36 for frictional damping. In one embodiment, the insert 26 may include a substantially flat body. In other embodiments tab or tang 508 may extend from a main body portion of the insert inlay 26 to hold the insert inlay 26 in a relative position with respect to the remainder of the rotor.

Figure 4:
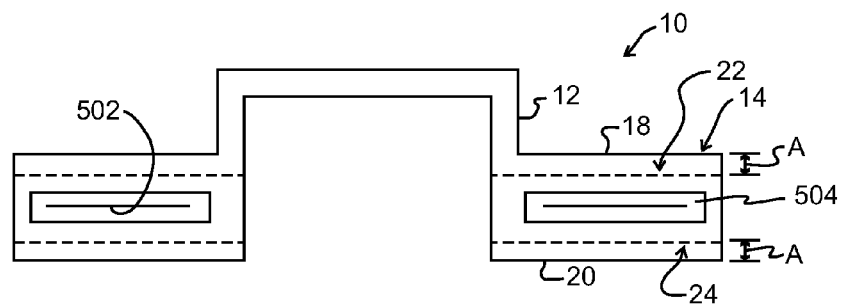
FIG. 4 is a sectional view of a brake rotor having a self damping component according to one embodiment of the invention.

Referring now to FIG. 4, in another embodiment of the invention, the insert 26 may be in the form of a self-contained, self-damping device which may be inserted in, attached to or provided as an inlay in at least the first rotor cheek 14. In one embodiment, the self-contained, self-damping insert 26 may be a tube which has been pressed together to provide opposing surfaces which may dissipate vibrational energy by frictional movement of the surfaces against each other. If desired a damping coating may also be provided on the outer surfaces of the tube. In another embodiment, the tube may provide one of the hardened regions 22 or 24.

Figure 5:
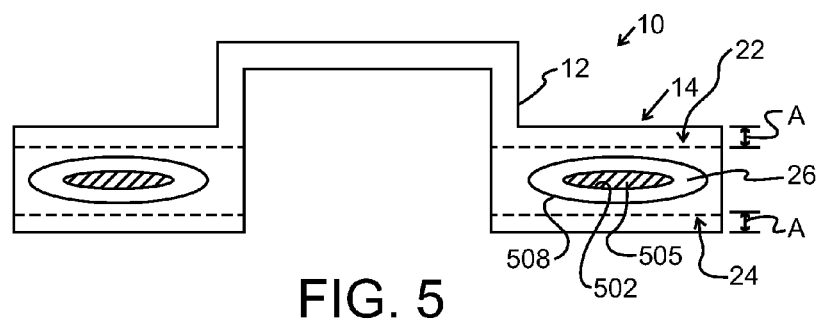
FIG. 5 is a sectional view of a brake rotor having a self damping component according to another embodiment of the invention.

Referring now to FIG. 5, in another embodiment of the invention, the self-contained, self-damping insert 26 in the form of a tube may further include a material 505 such as a fluid or particles to aid in damping the first brake rotor cheek 14. The use of damping inserts 26 also tends to increase the thickness of rotor. However, the thickness can be greatly reduced by using hardened surfaces or regions 22, 24.

Figure 6:
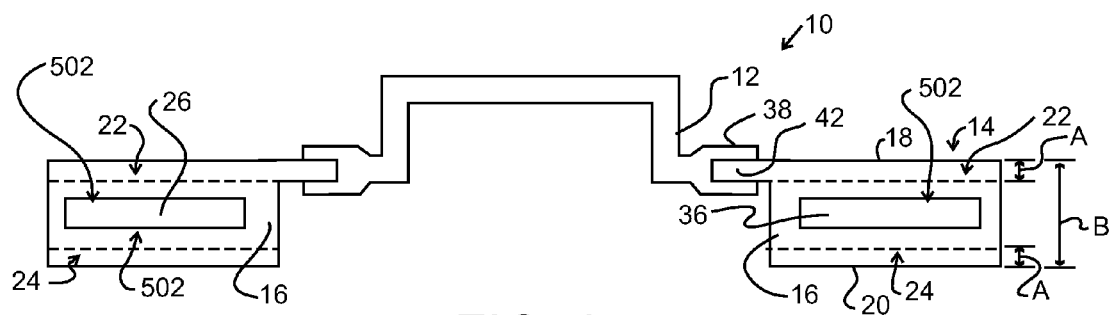
FIG. 6 is a sectional view of a brake rotor including a single brake rotor cheek having a first hardened region and where the brake rotor cheek and the brake rotor hub are composed of different materials according to one embodiment of the invention.

Referring now to FIG. 6, one embodiment may include a product 10 such as a disc brake rotor including a hub portion 12 and at least a first rotor cheek 14. The first rotor cheek 14 may be attached to the hub portion 12 and may be of different material. The first rotor cheek 14 may have a radially inwardly extending rotor cheek flange 42 which may be rigidly attached to a hub flange 38 extending from the hub portion 12. The rotor cheek flange 42 and the hub flange 38 may be attached by welding, fusing, or any other suitable bonding means. The connection between hub flange 38 and rotor cheek flange 42 maintains the structural integrity of brake rotor 10 despite torsional loading during vehicle braking. In a preferred embodiment, the product 10 may include the hub portion 12 and the first rotor cheek 14 made from distinct, cast or machined metals.

Referring again to FIG. 1, the hardened regions 22, 24, in one embodiment, may be provided by heat-treating the body 16 which may be made out of cast iron or cast steel to provide a nitro-carburized ferrous material. In one embodiment, the heat treating comprises heating the first brake rotor cheek 14 in a heat treatment furnace including heating the furnace to a temperature ranging from about 690-750° C., and introducing nitrogen, ammonium, and a liquid or vaporous compound including carbon, hydrogen and oxygen into the furnace. Other method is via Plasma nitro carburizing. The heat treatment may be conducted for a period sufficient to extend the thickness of the first hardened region 22 and second hardened region 24, a distance ranging from about 0.1 to about 2 mm. In one embodiment, the heat treating is conducted for a period of 2 hours. If desired, in one exemplary embodiment a portion of the rotor may be masked to prevent hardening of the portion covered by the mask. Suitable masking material may include, but is not limited to, ceramic coating or other suitable types that withstand high temperatures.

In embodiments wherein the frictional surface 502 is provided as a surface of the body 16 or the insert 26 or a layer 36 over one of the same, the frictional surface 502 may have a minimal area over which frictional contact may occur that may extend in a first direction a minimum distance of 0.1 mm and/or may extend in a second (generally traverse) direction a minimum distance of 0.1 mm. In one embodiment the insert 504 may be an annular body and the area of frictional contact on a frictional surface 502 may extend in an annular direction a distance ranging from about 20 mm to about 1000 mm and in a transverse direction ranging from about 10 mm to about 75 mm.

In embodiments wherein at least a portion of the rotor is manufactured such that the insert 26 and/or the particles or fibers are exposed to the temperature of a molten material such as in casting, the insert 26 and/or particles or fibers may be made from materials capable of resisting flow or resisting significant erosion during the manufacturing. For example, the insert 26 and/or the particles or fibers may include refractory materials capable of resisting flow or that do not significantly erode at temperatures above 1100° F., above 2400° F., or above 2700° F. When molten material, such as metal, is cast around the insert 26 and/or the particles, the insert 26 or the particles should not be wet by the molten material. The molten material does not bond to the insert 26 or layer 36 at locations wherein a frictional surface 502 for providing frictional damping is desired.

Illustrative examples of suitable particles or fibers include, but are not limited to, particles or fibers including silica, alumina, graphite with clay, silicon carbide, silicon nitride, cordierite (magnesium-iron-aluminum silicate), mullite (aluminum silicate), zirconia (zirconium oxide), phyllosilicates, or other high-temperature-resistant particles. In one embodiment of the invention the particles may have a length along the longest dimension thereof ranging from about 1 μm-350 μm, or 10 μm-250 μm.

In another embodiment, the layer 36 may be a coating over the body 16 of the part or the insert 26. The coating may include a plurality of particles which may be bonded to each other and/or to the surface of the body 16 of the part or the insert 26 by an inorganic or organic binder or other bonding materials. Illustrative examples of suitable binders include, but are not limited to, epoxy resins, phosphoric acid binding agents, calcium aluminates, sodium silicates, wood flour, or clays. In another embodiment of the invention the particles may be held together and/or adhered to the body 16 or the insert 26 by an inorganic binder. In one embodiment, the coating may be deposited on the insert 504 or body 16 as a liquid dispersed mixture of alumina-silicate-based, organically bonded refractory mix.

In another embodiment, the coating may include at least one of alumina or silica particles, mixed with a lignosulfonate binder, cristobalite ($SiO_2$), quartz, or calcium lignosulfonate. The calcium lignosulfonate may serve as a binder. In one embodiment, the coating may include IronKote. In one embodiment, a liquid coating may be deposited on a portion of the insert 26 and may include any high temperature ceramic coating, such as but not limited to, Ladle Kote 310B. In another embodiment, the coating may include at least one of clay, $Al_2O_3$, $SiO_2$, a graphite and clay mixture, silicon carbide, silicon nitride, cordierite (magnesium-iron-aluminum silicate), mullite (aluminum silicate), zirconia (zirconium oxide), or phyllosilicates. In one embodiment, the coating may comprise a fiber such as ceramic or mineral fibers. In various embodiments, the thickness of the layer 36, particles and/or fibers may range from about 1 μm-400 μm, 10 μm-400 μm, 30 μm-300 μm, 30 μm-40 μm, 40 μm-100 μm, 100 μm-120 μm, 120 μm-200 μm, 200 μm-300 μm, 200 μm-250 μm, or variations of these ranges.

In yet another embodiment of the invention the particles or fibers may be temporarily held together and/or to the surface of the insert 26 by a fully or partially sacrificial coating. The sacrificial coating may be consumed by molten metal or burnt off when metal is cast around or over the insert 26. The particles or fibers are left behind trapped between the body 16 of the cast part and the insert 26 to provide a layer 36 consisting of the particles or fibers or consisting essentially of the particles or fibers. The layer 36 may be provided over the entire insert 26 or only over a portion thereof.

In one embodiment the insert 26 may have a minimum average thickness of 0.2 mm and/or a minimum width of 0.1 mm and/or a minimum length of 0.1 mm. In another embodiment the insert 26 may have a minimum average thickness of 0.2 mm and/or a minimum width of 2 mm and/or a minimum length of 5 mm. In other embodiments the insert 26 may have a thickness ranging from about 0.1-20 mm, 0.1-6.0 mm, or 1.0-2.5 mm, or ranges therebetween.

When the term "over," "overlying," "overlies," "under," "underlying," or "underlies" is used herein to describe the relative position of a first layer or component with respect to a second layer or component such shall mean the first layer or component is directly on and in direct contact with the second layer or component or that additional layers or components may be interposed between the first layer or component and the second layer or component.

The above description of embodiments of the invention is merely exemplary in nature and, thus, variations thereof are not to be regarded as a departure from the spirit and scope of the invention.

What is claimed is:

1. A product comprising at least a first brake rotor cheek comprising a first body defining at least a first portion of a first outer surface of the first body, and further comprising a first damping insert received as an inlay in the first body and constructed and arranged to dampen vibration of the first brake rotor cheek during operation, wherein the insert comprises a tube providing a second portion of the first outer surface, a first hardened region extending from the first portion of the first outer surface toward the center of the first body wherein the first hardened region comprises a nitro-carburized ferrous metal, and wherein the tube has a damping coating thereon and further encloses a fluid damping material and further comprising a second brake rotor cheek comprising a second body and at least a second outer surface, a second hardened region extending from the second outer surface toward the center of the second body, and wherein the first rotor cheek comprises a first inner surface opposite the first outer surface, and wherein the second rotor cheek comprises a second inner surface opposite the second outer surface, and a plurality of spaced apart vanes extending between the first inner surface and the second inner surface and wherein the thickness of the first brake rotor cheek, second brake rotor cheek, and vanes extending therebetween is less than 500 mm wherein the first hardened region extends from the first outer surface toward the center of the first body a distance ranging from about 0.1 mm to about 2 mm and wherein the first hardened region is a continuous metallurgical structure with the first body without any defining interfaces therebetween.

2. A product as set forth in claim 1 wherein the first body further comprises a cast iron.

3. A product as set forth in claim 1 wherein the thickness of the first brake rotor cheek is less than 5 mm.

4. A product as set forth in claim 1 wherein each of the first hardened region and second hardened region each comprise a nitro-carburized ferrous metal.

5. A product as set forth in claim 1 and further comprising a second damping insert received in the second body and constructed and arranged to damp vibration of the second brake rotor cheek during operation.

6. A product as set forth in claim 1 further comprising a second insert received in the second body, the first insert and second insert each being constructed and arranged to damp vibration of the product during operation.

7. A product as set forth in claim 6 wherein the combined thickness of the first rotor cheek, second rotor cheek and vanes is less than 10 mm.

8. A product as set forth in claim 6 wherein the first insert has a thickness ranging from about 1.0 mm to about 3.5 mm and the thickness of the first rotor cheek is less than 5 mm and the second insert has a thickness ranging from about 1.0 mm to about 3.5 mm and the thickness of the second rotor cheek is less than 5 mm.

9. A product as set forth in claim 1 wherein the second hardened region extends from the second outer surface toward the center of the second body a distance ranging from about 0.1 mm to about 2 mm.

10. A product as set forth in claim 1 wherein the first insert has a thickness ranging from about 1.0 mm to about 3.5 mm and the thickness of the first rotor cheek is less than 5 mm.

11. A product as set forth in claim 1 further comprising a second damping insert received in the second body wherein the second damping insert has a thickness ranging from about 1.0 mm to about 3.5 mm and the thickness of the first rotor cheek is less than 5 mm.

12. A product as set forth in claim 1 wherein the second hardened region comprises a second inlay received in the second body and constructed and arranged to damp vibration of the second rotor cheek.

13. A product as set forth in claim 1 wherein the first hardened region is sufficiently hard enough so that the first brake rotor does not have to be resurfaced due to wear during braking.

14. A product comprising at least a first brake rotor cheek comprising a first body and at least a first outer surface of the first body, a first hardened region extending from the first outer surface toward the center of the first body and wherein the first hardened region comprises a nitro-carburized ferrous metal, wherein the first brake rotor cheek further comprises a second outer surface on the opposite side of the first body from the first outer surface, a second hardened region extending from the second outer surface toward the center of the first body, and further comprising a first damping insert received in the first body and constructed and arranged to dampen vibration of the first brake rotor check during operation wherein the insert is interposed between the first hardened region and second hardened region and wherein the thickness of the first brake rotor cheek is less than 5 mm wherein the first hardened region extends from the first outer surface toward the center of the first body a distance ranging from about 0.1 mm to about 2 mm and wherein the first hardened region is a continuous metallurgical structure with the first body without any defining interfaces therebetween.

15. A product as set forth in claim 14 wherein the first hardened region is sufficiently hard enough so that the first brake rotor does not have to be resurfaced due to wear during braking.

16. A product as set forth in claim 14 wherein the first body further comprises a cast iron.

17. A product as set forth in claim 14 wherein the second hardened region comprises a nitro-carburized ferrous metal.

18. A product as set forth in claim 14 wherein the second hardened region extends from the second outer surface toward the center of the second body a distance ranging from about 0.1 mm to about 2 mm.

19. A product as set forth in claim 14 wherein the first damping insert has a thickness ranging from about 1.0 mm to about 3.5 mm.

20. A product as set forth in claim 19 wherein the insert is a substantially flat body.

21. A product comprising at least a first brake rotor cheek comprising a first body and at least a first outer surface of the first body, and further comprising a first damping insert received as an inlay in the first body and constructed and arranged to dampen vibration of the first brake rotor cheek during operation, wherein the first body comprises a first hardened region extending from the first outer surface toward the center of the first body wherein the first hardened region comprises a nitro-carburized ferrous metal wherein the thickness of the first brake rotor cheek is less than 5 mm and wherein the first hardened region is a continuous metallurgical structure with the first body without any defining interfaces therebetween.

* * * * *